US007450569B2

(12) United States Patent  
Menkhoff (10) Patent No.: US 7,450,569 B2  
(45) Date of Patent: Nov. 11, 2008

(54) APPARATUS AND METHOD FOR FILTERING DATA SYMBOLS FOR A DECISION BASED DATA PROCESSING SYSTEM

(75) Inventor: Andreas Menkhoff, Oberhaching (DE)

(73) Assignee: Infineon Technologies AG, Munich (DE)

( * ) Notice: Subject to any disclaimer, the term of this patent is extended or adjusted under 35 U.S.C. 154(b) by 768 days.

(21) Appl. No.: 10/799,346

(22) Filed: Mar. 12, 2004

(65) Prior Publication Data

US 2005/0123084 A1 Jun. 9, 2005

(30) Foreign Application Priority Data

Mar. 12, 2003 (DE) .................... 103 10 810

(51) Int. Cl.
*H04L 12/66* (2006.01)
(52) U.S. Cl. .................... 370/352; 370/412; 375/350
(58) Field of Classification Search ................ 370/203, 370/206, 212, 213, 215, 252, 412; 375/316, 375/345, 346, 348, 350
See application file for complete search history.

(56) References Cited

U.S. PATENT DOCUMENTS 3,771,116 A * 11/1973 Farrah ........................ 367/8
5,406,588 A * 4/1995 Birchler et al. .............. 375/346
6,201,841 B1 * 3/2001 Iwamatsu et al. ........... 375/346
6,246,717 B1 * 6/2001 Chen et al. .................. 375/226
6,377,640 B2 * 4/2002 Trans ......................... 375/354
6,560,304 B1 * 5/2003 Yoon et al. .................. 375/371
6,704,353 B1 * 3/2004 McCarty et al. ............. 375/227
6,804,192 B1 * 10/2004 Marchok et al. ............ 370/210
6,940,827 B2 * 9/2005 Li et al. ...................... 370/278
6,985,492 B1 * 1/2006 Thi et al. .................... 370/429
7,095,707 B2 * 8/2006 Rakib et al. ................. 370/204
2004/0137863 A1 * 7/2004 Walton et al. ............... 455/130
2004/0165690 A1 * 8/2004 Kaylani et al. .............. 375/372
2004/0247321 A1 * 12/2004 Lenz et al. .................. 398/100

FOREIGN PATENT DOCUMENTS

EP 0 584 912 A1 6/1993  
WO WO 01/39405 A2 5/2001

* cited by examiner

*Primary Examiner*—Ricky Ngo  
*Assistant Examiner*—Ben H Liu  
(74) *Attorney, Agent, or Firm*—Maginot, Moore & Beck (57) ABSTRACT

An apparatus is disclosed for filtering data symbols for a decision based data processing system. The apparatus includes a buffer store for buffer-storing a sequence of n sequentially received data symbols. The apparatus also includes an nth-order median filter which calculates the minimum intervals between the n buffer-stored data symbols and nominal data symbols and filters out that data symbol whose calculated minimum interval has a mean value for the calculated minimum intervals.

15 Claims, 10 Drawing Sheets

FIG 1
Prior art

FIG 2
Prior art $$\text{Min}\ \{a_i{}^2\} = \text{Min}\ \{1.62;\ 2.02;\ 2.42;\ 2.02\} = 1.62$$

4 nominal symbols

FIG 3
Prior art

Example:

| Transmitted symbol sequence (SS) | | SS1 | SS2 | SS3 | SS4 | SS5 | SS6 |
|---|---|---|---|---|---|---|---|
| | Re | +1 | -1 | +1 | -1 | +1 | +1 |
| | Im | +1 | +1 | +1 | -1 | -1 | -1 |

| Received symbol sequence (ES) | | ES1 | ES2 | ES3 | ES4 | ES5 | ES6 |
|---|---|---|---|---|---|---|---|
| | Re | 1.5 | 0.1 | 0.4 | -0.6 | 1.1 | 0.8 |
| | Im | 0.8 | 0.1 | 0.2 | -0.1 | -0.9 | -2 |

| Interval Min $\{a_i^2\}$ | $a_i^2$ (min) | 0.29 | 1.62 | 1 | 0.97 | 0.02 | 1.04 |
|---|---|---|---|---|---|---|---|

| Decision (ES) | | ES1 | ES2 | ES3 | ES4 | ES5 | ES6 |
|---|---|---|---|---|---|---|---|
| | Re | +1 | +1 | +1 | -1 | +1 | +1 |
| | Im | +1 | +1 | +1 | -1 | -1 | -1 |

Table

Example:

| Transmitted symbol sequence (SS) | | SS1 | SS2 | SS3 | SS4 | SS5 | SS6 |
|---|---|---|---|---|---|---|---|
| | Re | +1 | -1 | +1 | -1 | +1 | +1 |
| | Im | +1 | +1 | +1 | -1 | -1 | -1 |

| Received symbol sequence (ES') | | ES1 | ES2 | ES3 | ES4 | ES5 | ES6 |
|---|---|---|---|---|---|---|---|
| | Re | 1.5 | 0.1 | 0.4 | -0.6 | 1.1 | 0.8 |
| | Im | 0.8 | 0.1 | 0.2 | -0.1 | -0.9 | -2 |

Interval $t_0$, $t_1$, $t_2$, $t_3$

| Min $\{a_i^2\}$ $a_i^2{(min)}$ | 0.29 | 1.62 | 1 | 0.97 | 0.02 | 1.04 |
|---|---|---|---|---|---|---|

3-element groups:
- $t_0$ ( 0.29 ; 1.62 ; 1 ) ⟶ 1 (Pos3)
- $t_1$      (1.62 ; 1 ; 0.97 ) ⟶ 1 (Pos2)
- $t_2$             ( 1 ; 0.97 ; 0.02 ) ⟶ 0.97 (Pos2)
- $t_3$                    ( 0.97 ; 0.02 ; 1.04 ) ⟶ 0.97 (Pos1)

Sorted intervals: Pos3, Pos2, Pos2, Pos1

| Filtered received symbol sequence (ES') | | ES1' | ES2' | ES3' | ES4' |
|---|---|---|---|---|---|
| | Re | 0.4 | 0.4 | -0.6 | -0.6 |
| | Im | 0.2 | 0.2 | -0.1 | -0.1 |

| Decision E | | ES1 | ES2 | ES3 | ES4 |
|---|---|---|---|---|---|
| | Re | +1 | +1 | -1 | -1 |
| | Im | +1 | +1 | -1 | -1 |

Table

APPARATUS AND METHOD FOR FILTERING DATA SYMBOLS FOR A DECISION BASED DATA PROCESSING SYSTEM

BACKGROUND

The invention relates to a method and an apparatus for filtering data symbols for a decision based data processing system within a receiver.

Figure 1:
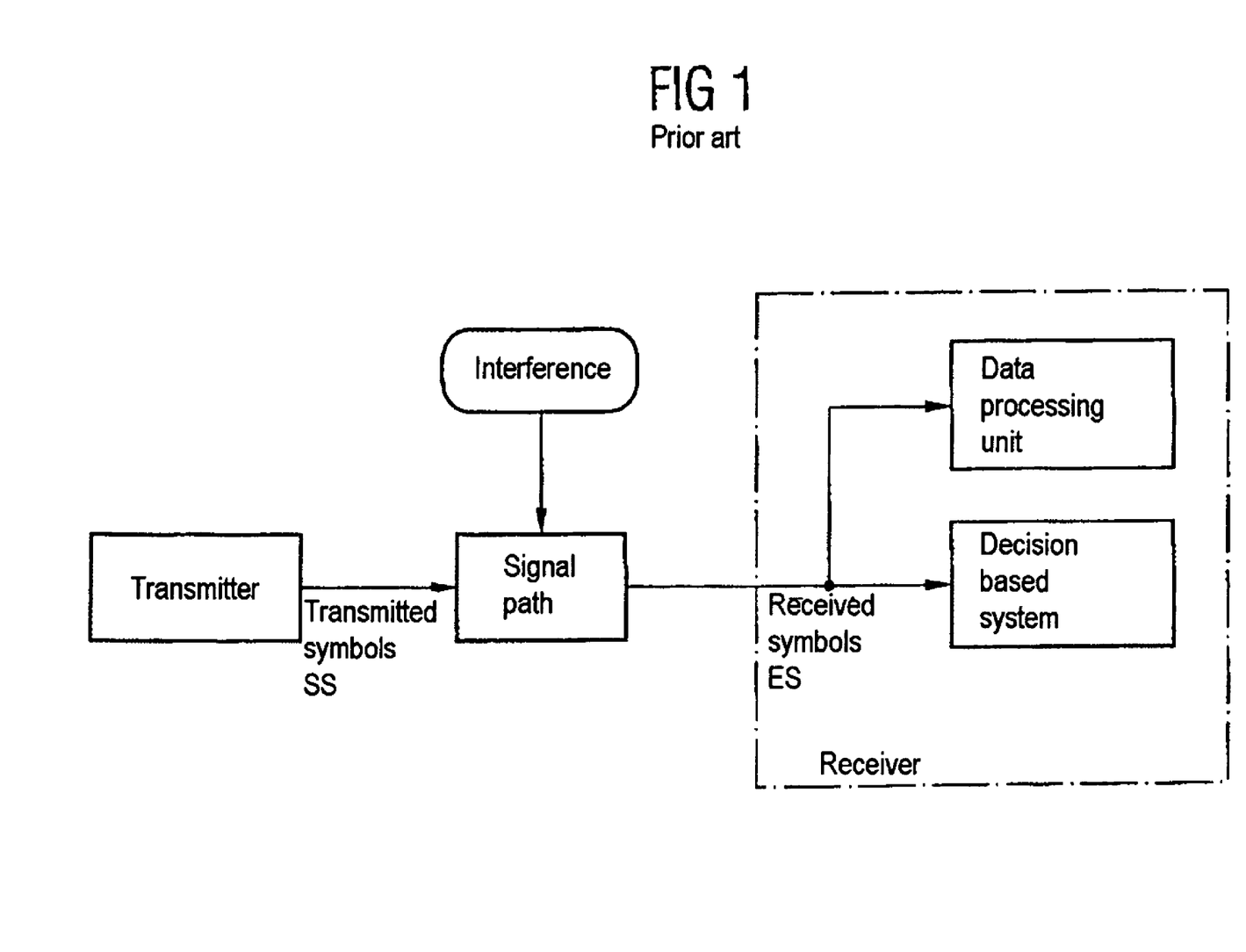
FIG. 1 shows a circuit arrangement having a receiver based on the prior art.

FIG. 1 shows a conventional arrangement for data transmission. A transmitter transmits transmitted symbols SS to a receiver via a signal path or data transmission channel. The receiver receives the received symbols ES, which are processed by a data processing unit, for example. Signal interference means that the received symbols ES sometimes differ from the transmitted symbols SS. The transmitted symbols SS and the received symbols ES are data symbols comprising one or more data bits.

The receiver is a QAM receiver, for example. During data transmission via the real data transmission channel, the received signal ES normally has linear distortions and an additional noise component. The receiver takes the received signal ES and reconstructs the bit sequence from the data source. To this end, the analog received signal is first converted into a digital signal and is then sent to a mixing stage. A downstream reception filter suppresses any interference signals outside of the transmission frequency band. Suitable proportioning of a "matched filter" MF increases the reliability of detection as a result. The matched filter is a digital reception filter within the receiver, said digital reception filter being matched to a transmission filter within the transmitter such that the amplitude of the received signal is at a maximum at the sampling times. The output signal from the matched filter is supplied to a carrier phase detector TPD which is provided for carrier phase detection for a digital received signal. The carrier phase detector TPD sends a carrier phase detection error signal to a downstream digital loop filter. The digital loop filter and the downstream numerically controlled oscillator NCO deliver a digital control signal for a mixing stage. The frequency and phase estimation for the received signal ES can take place in one or two stages. In the case of a two-stage QAM receiver, said receiver contains a carrier frequency loop for detecting a carrier frequency for the received signal in a first carrier frequency reception range and a downstream carrier phase loop for detecting a carrier phase for the received signal in a second carrier frequency capture range.

The carrier phase detector TPD and the carrier frequency detector TFD are "decision based" systems (decision directed systems). The receiver contains a decision maker which compares the received symbols ES received with nominal symbols and associates the received symbol ES with that nominal symbol which is at the shortest interval from the received symbol ES.

Figure 2:
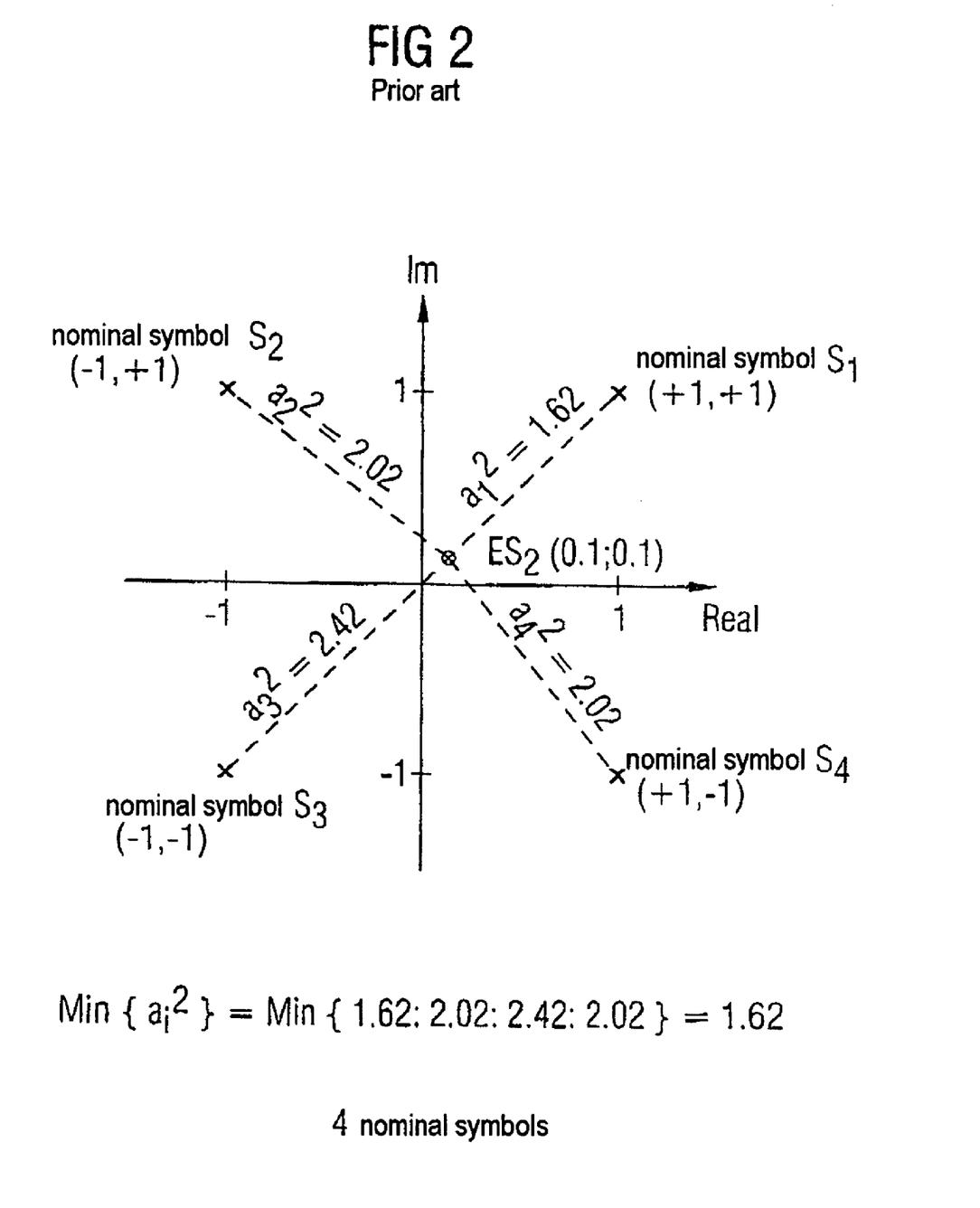
FIG. 2 shows a graph to explain the way in which decision based systems work.

FIG. 2 shows an example of the association between a received symbol ES and a nominal symbol $ES_{nominal}$ on the basis of the prior art. In the example shown, the nominal symbols S1, S2, S3, S4 have the values:

S1=+1, +1;
S2=−1, +1;
S3=−1, −1;
S4=+1, −1.

In the example shown, a received symbol ES=0.1; 0.1 is received by the receiver.

A decision maker calculates the intervals between the received symbol ES and the various nominal symbols S1-S4. In the example illustrated in FIG. 2, the intervals $a_i$ are:

$A1^2$=1.62
$A2^2$=2.02;
$A3^2$=2.42;
$A4^2$=2.02.

The decision maker selects the minimum interval, which is $A1^2$=1.62 in the example. The probability of the transmitted symbol SS originally transmitted corresponding to the nominal symbol S1 is therefore greatest, and the received symbol ES=0.1; 0.1 is identified as nominal symbol S1=+1, +1.

Figure 3:
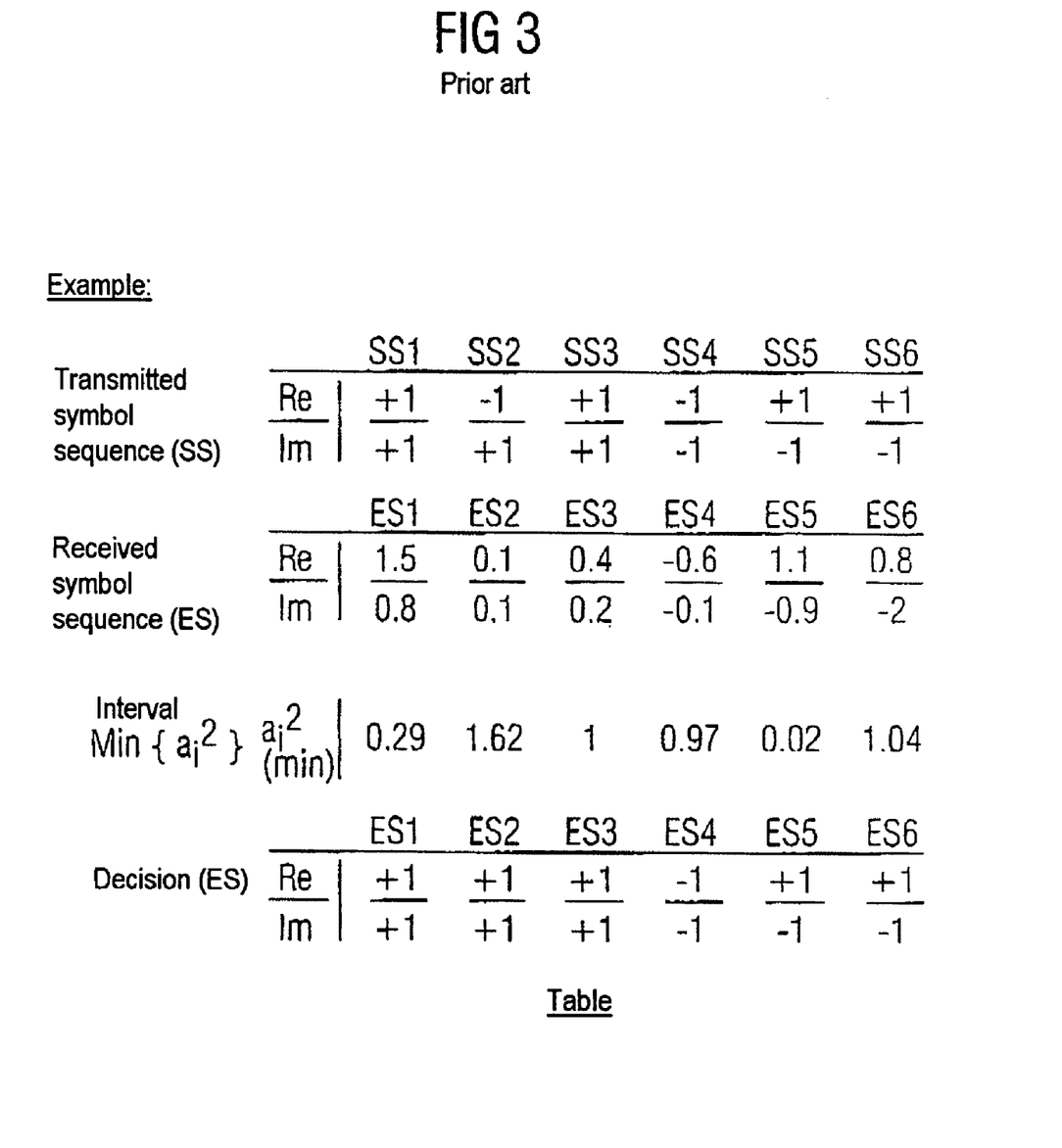
FIG. 3 shows a table to explain the problem on which the invention is based.

FIG. 3 shows an example with 6 transmitted symbols, which are transmitted to the receiver by the transmitter via the data transmission channel and arrive at the receiver as a received symbol sequence ES. In the example illustrated in FIG. 3, the transmitter transmits a transmitted symbol SS1=−1, +1, for example, which is available to the receiver as received symbol ES2=+0.1, +0.1. As explained in connection with FIG. 2, the receiver makes a decision and wrongly identifies the received symbol ES2 as nominal symbol S1=+1; +1. This incorrect decision is supplied to the decision based system within the receiver, for example to a clock phase detector or to a carrier frequency detector. Decision based systems (decision directed systems) work well provided that the decisions supplied to them are correct. The decision based systems can also tolerate incorrect decisions provided that the incorrect decisions arise only in very rare cases and with very low probability. If the incorrect decisions occur more frequently or if the probability of incorrect decisions becomes greater, then the decision based systems, for example a carrier phase detector or a carrier frequency detector, fall out of step. In this case, a loop filter connected downstream of the carrier frequency estimator or clock phase estimator receives incorrect input values, which means that the mixing frequency which is sent by the numerically controlled oscillator NCO likewise has an ever greater level of error. The erroneous mixed signal causes the number of incorrect decisions to rise, which means that the control error increases further.

SUMMARY

It is therefore the object of the present invention to provide an apparatus for a method for filtering data symbols for a decision based data processing system, in which the number of incorrect decisions which are supplied to the decision based data processing system is minimal.

The invention provides an apparatus for filtering data symbols for a decision based data processing system having:

a buffer store for buffer-storing a sequence of n sequentially received data symbols (ES) and having an nth-order median filter which calculates the minimum intervals ($a_{Imin}$) between the n buffer-stored data symbols and nominal data symbols and filters out that data symbol whose calculated minimum interval ($A_{Imin}$) has a mean value within the group of calculated minimum intervals.

In one preferred embodiment of the inventive apparatus, the median filter has:

a plurality of calculation circuits which respectively calculate the minimum interval between the buffer-stored data symbol (ES) and the predetermined nominal data symbols ($ES_{nominal}$), a control circuit which has a sorting circuit for sorting the calculated minimum intervals according to their value and a selection circuit for selecting a mean minimum interval from the group of sorted minimum intervals, and a multiplexer which connects the buffer-stored data symbol (ES) associated with the selected mean minimum interval to the decision based data processing system.

In one preferred embodiment of the inventive apparatus, the buffer store for buffer-storing the n sequentially received data symbols is a FIFO register.

The median filter is preferably an nth-order median filter, where n is an odd number.

The median filter is preferably a third-order median filter.

In one alternative embodiment, the median filter is a fifth-order median filter.

In a first embodiment, the decision based data processing system is a clock phase detector.

In a further embodiment, a decision based data processing system is a carrier phase detector.

In a further embodiment, the decision based data processing system is an equalizer.

In one preferred embodiment, the nominal data symbols are stored in a nominal data register.

This nominal data register is preferably programmable.

The invention also provides a method for filtering data symbols for a decision based data processing system having the following steps:

a sequence of n sequentially received data symbols (ES) is buffer-stored;

the minimum intervals ($A_{min}$) between the buffer-stored data symbols (ES) and predetermined nominal data symbols are calculated;

the minimum intervals ($a_{Imin}$) are sorted according to their value;

a mean minimum interval is selected from the group of sorted minimum intervals; and the buffer-stored data symbol (ES) associated with the selected minimum interval is output to the decision based data processing system.

BRIEF DESCRIPTION OF THE DRAWINGS

The text below describes preferred embodiments of the inventive apparatus for filtering data symbols (ES) for a decision based data processing system with reference to the appended figures in order to explain features which are fundamental to the invention.

In the Figures

DESCRIPTION

Figure 4:
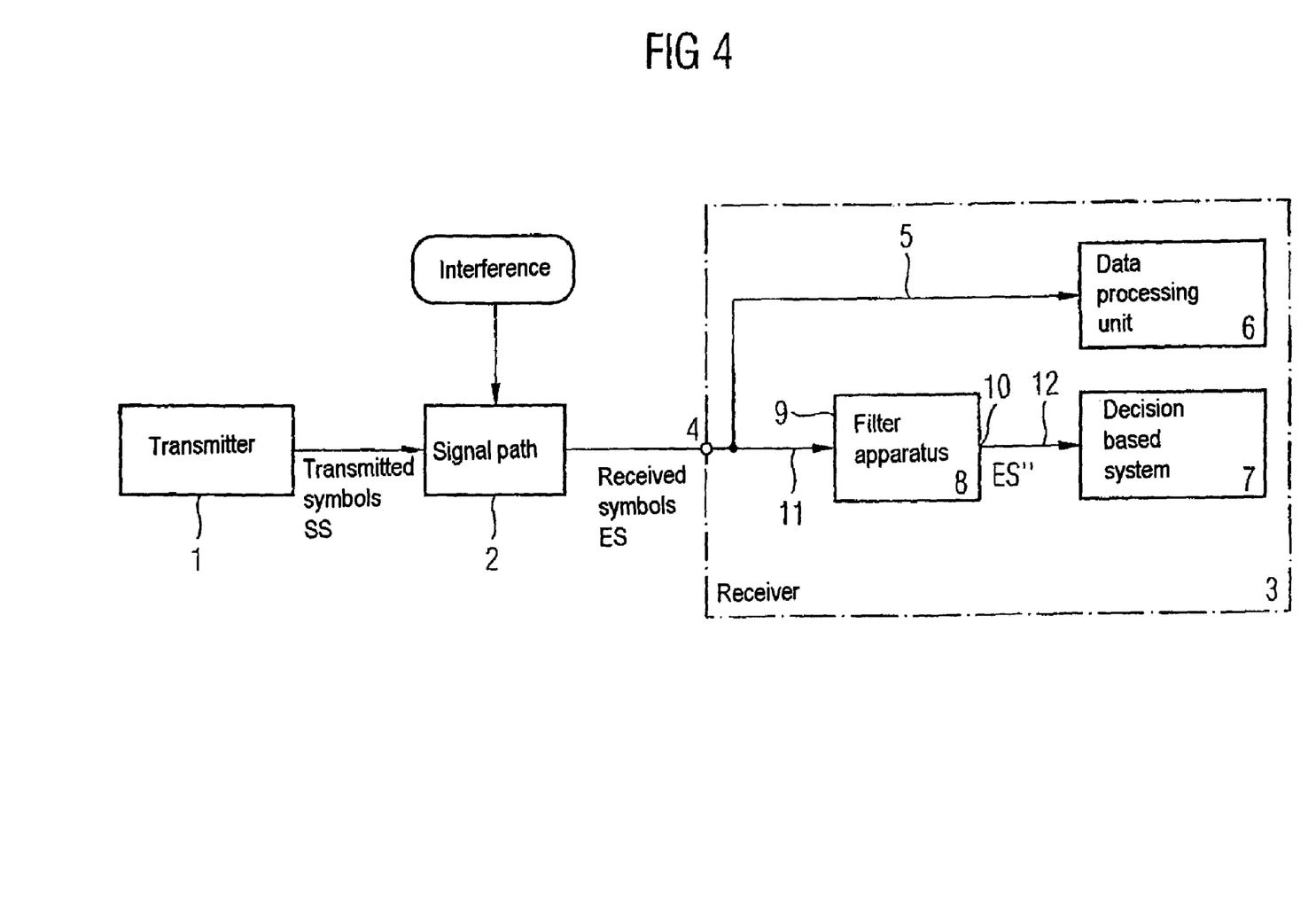
FIG. 4 shows a circuit arrangement having a receiver which contains the inventive filter apparatus.

As can be seen from FIG. 4, a transmitter 1 transmits transmitted data symbols SS to a receiver 3 via a data transmission channel or signal path 2. The received data symbols ES differ from the transmission data symbols SS originally transmitted on account of the channel interference or channel distortions. The receiver 3 has a signal input 4 which sends the received data symbols ES received to a data processing unit 6 via a line 5. In addition, the receiver 3 contains a "decision based" system 7, such as a clock phase detector or a carrier frequency detector for locking onto the received data signal.

In line with the invention, the receiver 3 contains a filter apparatus 8 for filtering the received data symbols (ES). To this end, the filter apparatus 8 has a signal input 9 and a signal output 10. The signal input 9 of the filter apparatus 8 is connected to the input 4 of the receiver 3 via a line 11 and receives the received data symbols ES. The filter apparatus 8 filters the data symbols ES received and sends the filtered data symbols ES' to the downstream decision based system 7 via a line 12.

Figure 5:
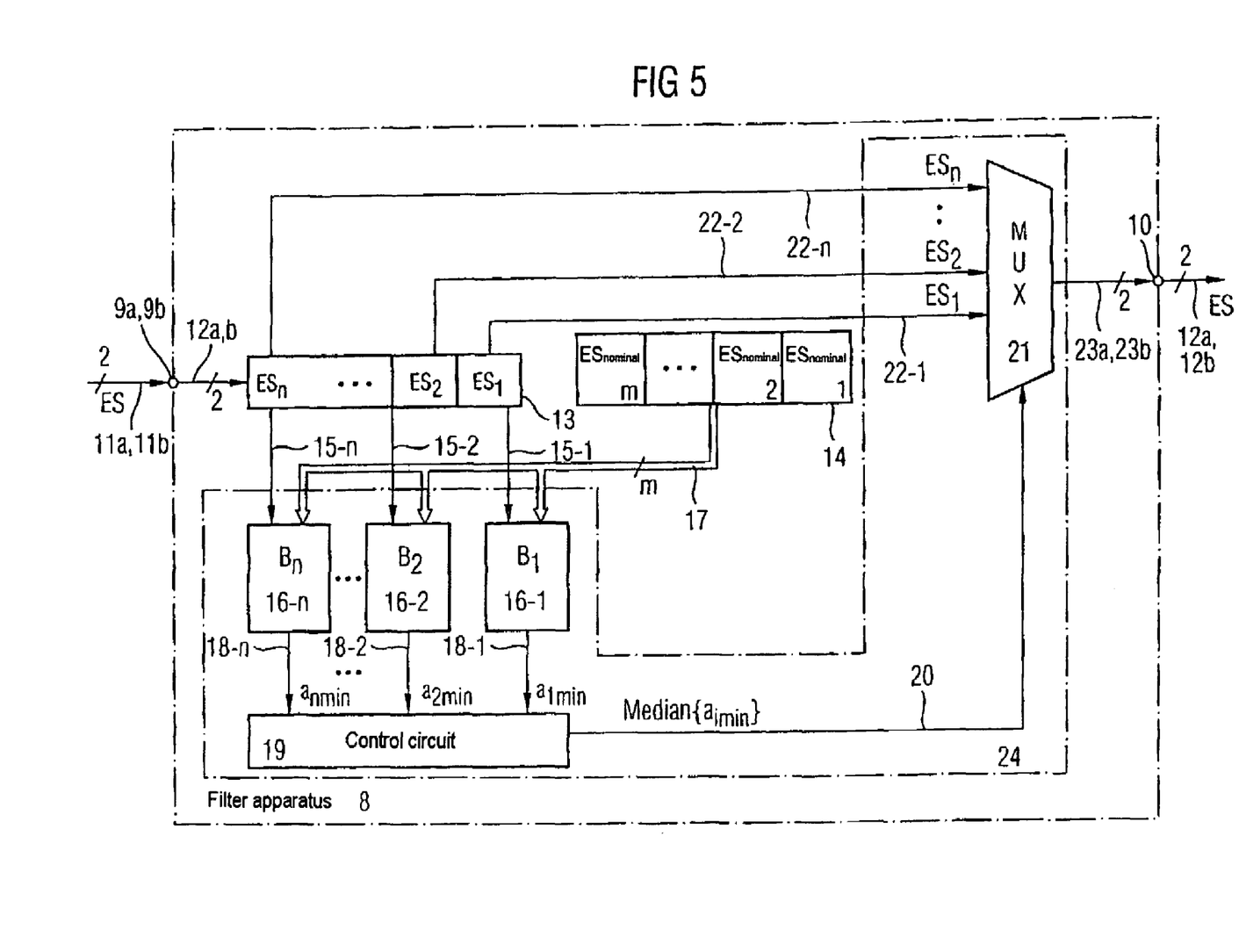
FIG. 5 shows a block diagram of a preferred embodiment of the inventive filter apparatus.

FIG. 5 shows the preferred embodiment of the inventive filter apparatus 8 for filtering data symbols. The filter apparatus 8 receives the received data symbols ES via a data input 9. In this case, each data symbol comprises a sequence of data values. By way of example, the data symbol ES comprises two data values for the real part and the imaginary part of a QAM received signal, as shown in FIG. 2. In this embodiment, the received data symbols ES are supplied to the data input 9a, 9b via two data lines 11a, 11b, with a data line 11a being provided for the real part and a data line 11b being provided for the imaginary part. The input 9a, 9b is connected by means of two data lines 12a, 12b to a buffer store 13, which is suitable for buffer-storing a sequence of n sequentially received data symbols ES. The buffer store 13 is a register, preferably a FIFO register.

Besides the first register 13, the filter apparatus 8 contains a second register 14 storing m nominal data symbols $ES_{nominal}$. By way of example, the register 14 contains four nominal data symbols, as FIG. 2 shows, namely:

S1=+1; +1
S2=−1; +1
S3=−1; −1
S4=+1; −1

The first data register 3, in which the received data symbols ES received have been buffer-stored, is connected by means of n data lines 15-1, 15-2 . . . 15-n to associated calculation circuits 16-1, 16-2, . . . 16-n. The calculation circuits 16-n each have a further input for reading in all the nominal data symbols $ES_{nominal}$ via data lines 17. The calculation circuits 16-i each calculate the minimum interval $a_{min}$ between the associated buffer-stored data symbol $ES_I$ and the predetermined nominal data symbols $ES_{nominal}$. The calculated minimum intervals $a_{min}$ are sent to a control circuit 19 via data lines 18. The control circuit 19 comprises a sorting circuit for sorting the calculated minimum intervals $a_{Imin}$ according to their calculated value. In addition, the control circuit 19 contains a selection circuit for selecting a mean minimum interval Median ($a_{min}$) from the group of sorted minimum intervals. The control circuit 19 uses a control line 20 to actuate a multiplexer 21 whose inputs are connected to the first register 13 by means of data lines 22. The multiplexer 21 connects the buffer-stored data symbol $ES_I$ associated with the selected mean minimum interval Median $a_{Imin}$ to the decision based data processing system 7. The calculation circuits 16-i, the control circuit 19 and the multiplexer 21 together form an nth-order median filter 24 for filtering the n sequentially received data symbols $ES_I$ which have been buffer-stored in the buffer store 13. The median filter 24 calculates the minimum intervals $a_{min}$ between the n buffer-stored data symbols $ES_I$ and the predetermined nominal data symbols $ES_{nominal}$ and filters out that data symbol $ES_I$ whose calculated minimum interval $a_{min}$ has a mean value for the calculated minimum intervals. The median filter 24 is an nth-order median filter, where n is preferably an odd number. In a first embodiment, the median filter 24 is a third-order median filter. In an alternative embodiment, the median filter 24 is a fifth-order median filter.

In one preferred embodiment, the nominal data symbols $ES_{nominal}$ can be programmed using programming lines.

Figure 6:
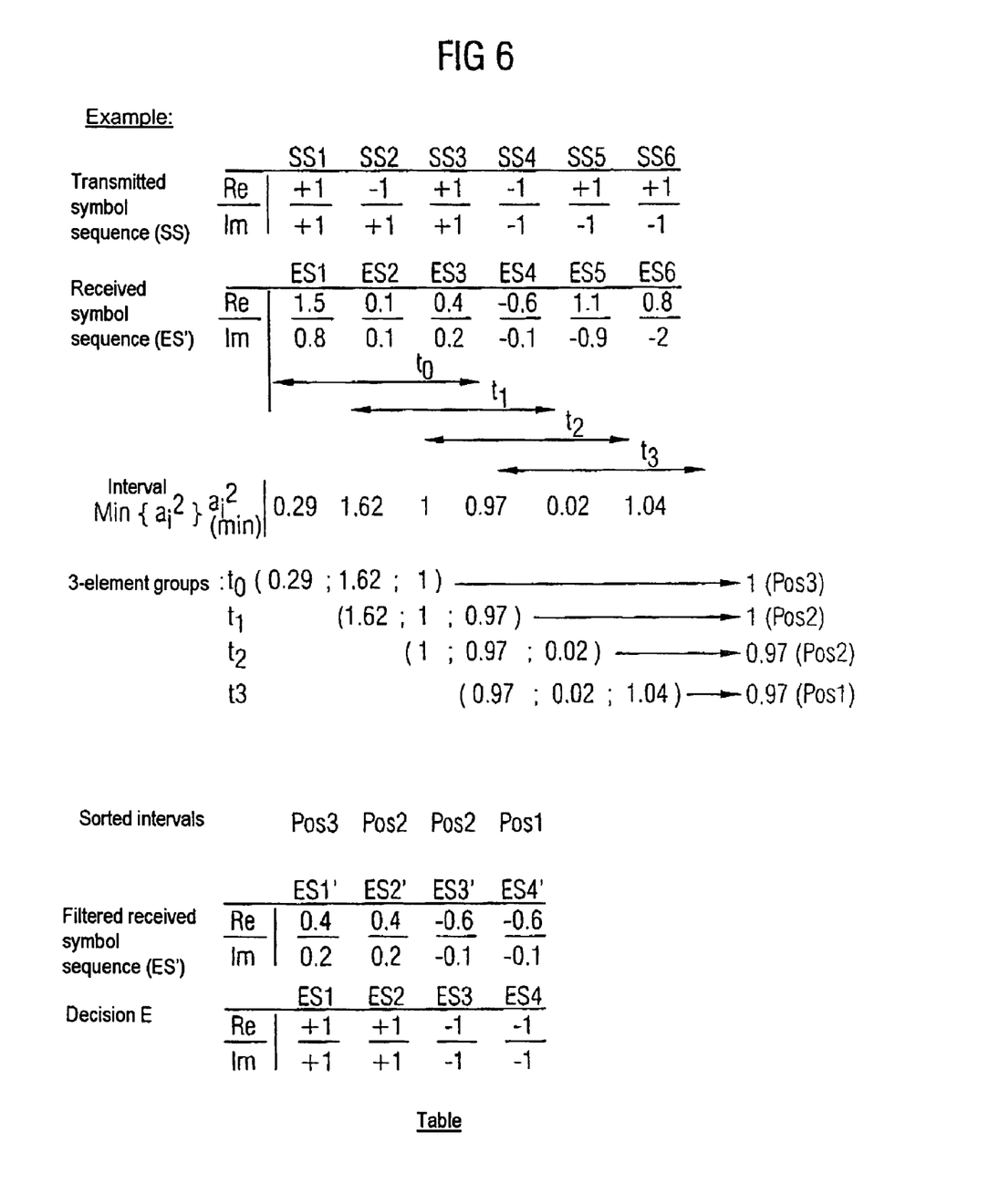
FIG. 6 shows a table to explain the way in which the inventive filter apparatus shown in FIG. 5 works.

FIG. 6 shows a table to explain the way in which the preferred embodiment of the inventive filter apparatus 8 shown in FIG. 5 works.

A transmitter 1 sends a sequence of transmitted symbols $SS_I$, the example shown in FIG. 6 involving six transmitted symbols being transmitted to the receiver 3 via the data transmission channel 2. Noise and signal distortions mean that the receiver 3 receives a sequence of received data symbols ES at its input 4. In the example shown in FIG. 6, both the transmitted data symbols and the received data symbols comprise two data values, namely a real part and an imaginary part. The received symbol sequence of received symbols $ES_I$ is buffer-stored in the first register 13 in the filter apparatus 8. For the buffer-stored received symbols $ES_I$, the calculation circuits 16-i calculate the respective minimum interval from the prescribed nominal data symbols $ES_{nominal}$. In the example shown in FIG. 6, the euclidean interval between the received symbol ES and the nominal symbol SS is calculated. In this case, a calculation circuit 16-i calculates the euclidean interval between the received symbol ES and all m prescribed nominal data symbols $ES_{nominal}$. If m, as FIG. 2 shows, amounts to four different nominal data symbols $ES_{nominal}$, a calculation circuit 16-i calculates four different intervals for the received data symbol ES and selects the minimum interval therefrom.

If, by way of example, the median filter 24 receives ES2=0.1; 0.1 as received symbol, then the intervals calculated are:

$A1^2=1.62$
$A2^2=2.02$;
$A3^2=2.42$;
$A4^2=2.02$.

From the intervals calculated, the minimum interval is selected, this being 1.62 in the example given. In the example shown in FIG. 6, the median filter 24 is a third-order median filter. The register 13 buffer-stores three received symbols $ES_I$ using a FIFO procedure.

At a time $t_0$, these are the received symbols ES1, ES2, ES3 for example, and at a time $t_1$ they are the three received symbols ES2, ES3, ES4 etc. For the 3-element groups formed, the calculation circuits 16-1, 16-2, 16-3 calculate the minimum intervals $a_{Imin}^2$ and supplies them to the control circuit 19 via the data lines 18-i. The control circuit 19 comprises a sorting circuit for sorting the calculated minimum intervals $a_{Imin}^2$ and a selection circuit which selects a mean minimum interval from the group of sorted minimum intervals.

In the example shown in FIG. 6, the minimum interval $A_{3\ min}^2=1$ situated in the third position is selected as a mean value at time $t_0$, since it is situated between the first minimum interval $A_1^2=0.29$ and the second-position minimum interval $A_2^2=1.62$. In the same way, the control circuit 19 identifies at time $t_1$ that the minimum interval situated at position 2 is the mean value. At time $t_2$, the control circuit 19 identifies that the value 0.97 is between the values 0.02 and the value 1 and selects position 2 for the value 0.97 as the mean value. In the same way, the minimum interval of 0.97 which is at position 1 is identified as the mean value at time $t_3$.

The control circuit 19 sends the identified position as control signal via the control line 20 to the multiplexers 21, which connects the buffer-stored data symbol $ES_I$ associated with the selected mean minimum interval to the decision based data processing system 7.

In the example shown in FIG. 6, the third (POS3) received symbol ES is first connected to the output 10 of the filter operation 8 via the line 23-3. Next, the received symbol ES situated at the second position (POS2) in a register 13 is connected to the output 10 of the filter apparatus 18 at time $t_1$, the received symbol in the illustrated example in turn being ES3. At time $t_2$, the received data symbol ES buffer-stored in second place (POS2) within the register 13 is connected to the output 10, and is the received symbol ES4 in the received data symbol sequence in the example illustrated. Finally, the received data symbol ES buffer-stored at position 1 in the reception register 13 is connected to the output 10 at time $t_3$, this in turn being the received symbol ES4 in the received data symbol sequence.

The result is a filtered received symbol sequence ES', as indicated in the table. The filtered output symbol sequence ES' is sent to the downstream decision based system 7. This makes a decision on the basis of the filtered received symbol sequence ES', for example for the clock phase or carrier frequency estimation.

As a comparison between the tables in FIG. 6 and FIG. 3 shows, the example illustrated involves the incorrect decision ES'2 in Table 3 being filtered out by the inventive filter apparatus 8, and only correct decisions being supplied to the decision based system 7 by the filter apparatus 8.

The invention filter apparatus 8 filters out the decisions which are probably incorrect and supplies the decision based system 7, for example the clock phase or carrier frequency selection circuit, with the decision which is probably correct. When using a decision based system 7 in the form of a clock phase detector or a carrier frequency detector, this greatly improves the control response of a receiver and greatly reduces the bit error rate for data processing.

Figure 7:
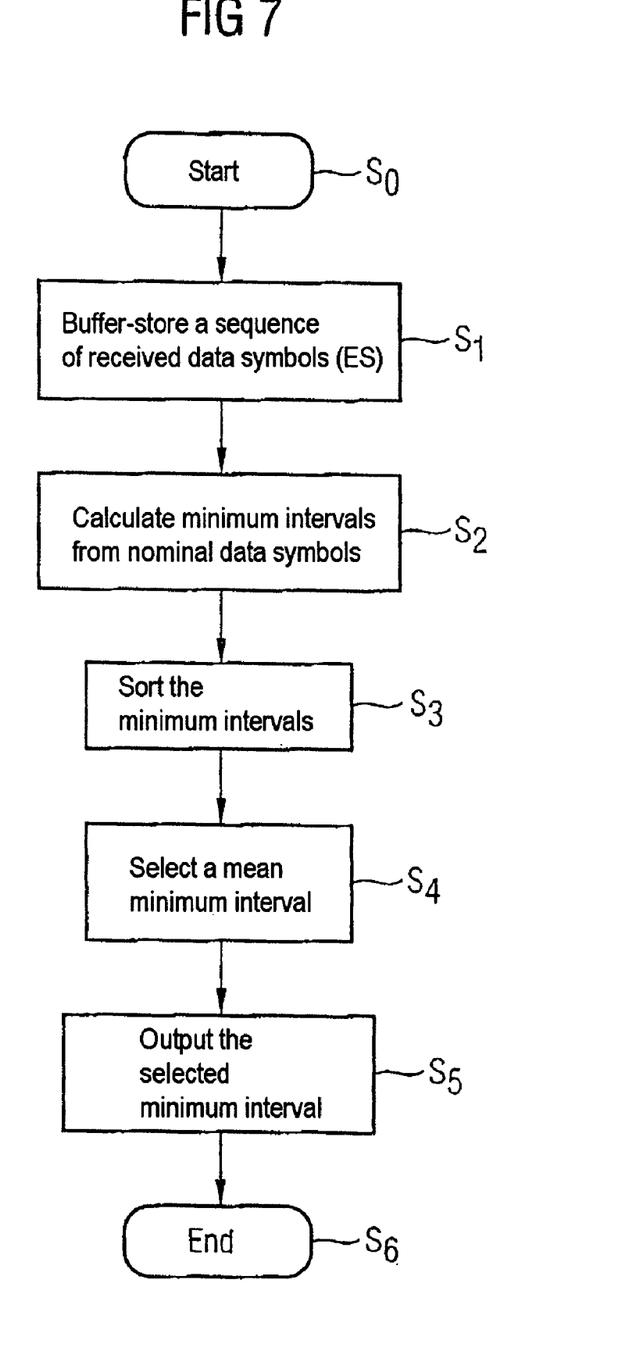
FIG. 7 shows a flowchart for the inventive method for filtering data symbols.

FIG. 7 shows a flowchart for the inventive method for filtering data symbols for a decision based data processing system.

Following a start step $S_0$, the data symbols ES received are buffer-stored in a buffer store 13 in a step S1.

Next, in a step S2, the minimum intervals $a_I$ from all nominal data symbols $ES_{nominal}$ stored in the register 14 are calculated by the calculation circuits 16-i.

In a step S3, the control circuit 19 first sorts the calculated minimum intervals $a_{min}$ according to their size or value.

Next, the control circuit 19 selects a mean minimum interval from the group of sorted minimum intervals and actuates the multiplexer 21 via the control line 20 in step S4.

In a further step S5, the buffer-stored data symbol associated with the selected minimum interval is output to the downstream decision based data processing system 7.

The inventive method is ended in step S6.

Figure 8:
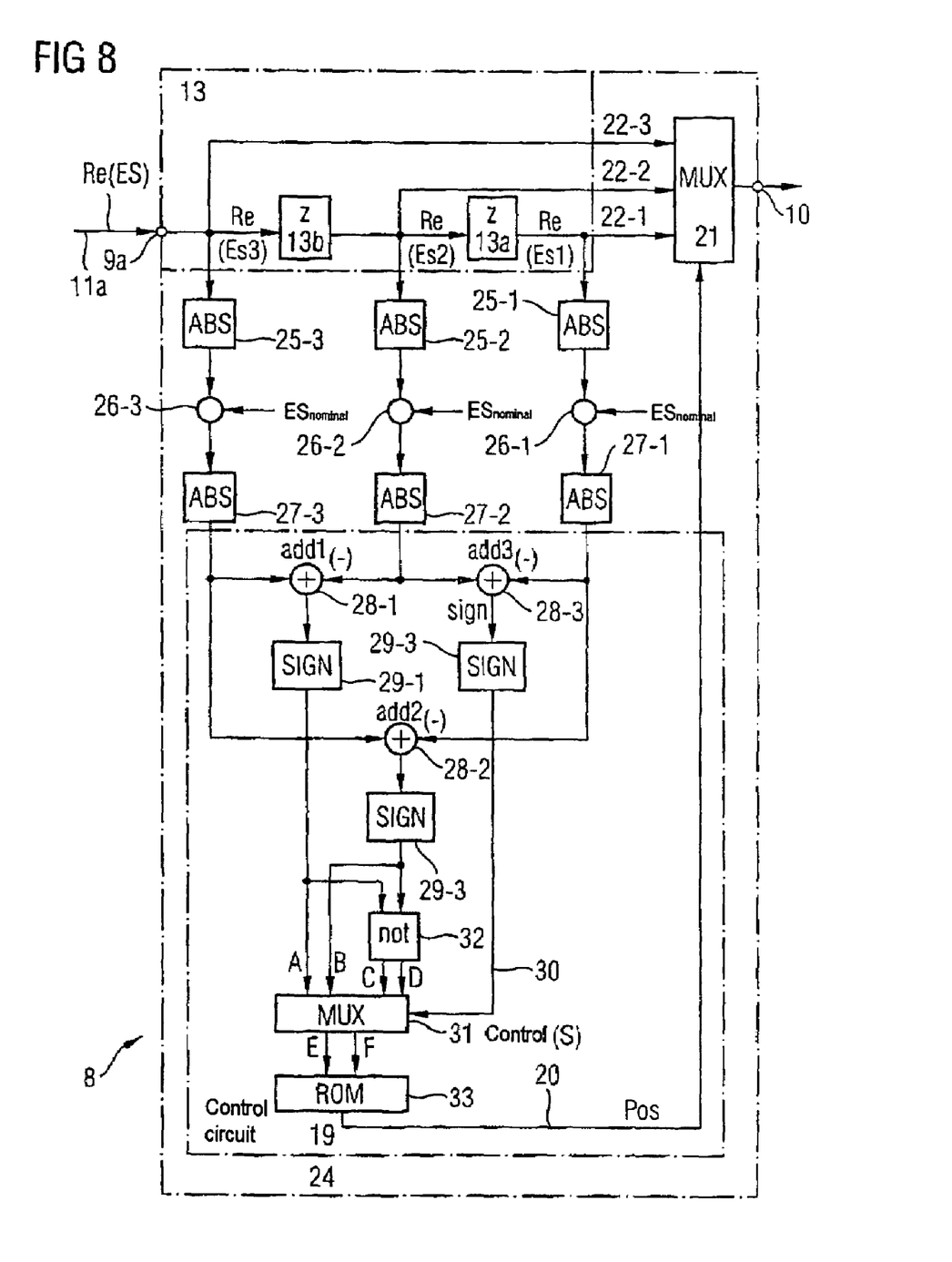
FIG. 8 shows a block diagram of a preferred embodiment of the inventive filter apparatus.

FIG. 8 shows a preferred embodiment of the inventive filter apparatus 8. The embodiment shown in FIG. 8 is a filter apparatus 8 having a third-order median filter 24. The register 13 sequentially buffer-stores three received symbols ES1, ES2, ES3. To this end, the register 13 contains two time delay elements 13a, 13b. The register 13 is connected to the inputs of the multiplexer 21 by means of data lines 22.

In the embodiment shown in FIG. 8, the filter apparatus 8 is supplied, by way of example, to the real part of a received data symbol ES comprising two data values. For a sequence of received data symbols ES each comprising a real part and an imaginary part, as in the example shown in FIG. 6, the circuit arrangement shown in FIG. 8 is provided once for the real part and once for the imaginary part. The buffer-stored real part or the first data value in a received-symbol data pair comprising two data values is respectively supplied to a circuit 25-i, which forms the absolute value or magnitude value therefrom.

Referring to FIG. 6, the real parts of the received symbol sequences ES3, ES4, ES5 are situated in the register 13 at time $t_3$, for example, i.e. real parts 0.4, −0.6, 1.1.

Re {ES1}=0.4
Re {ES2}=−0.6
Re {ES3}=1.1

The circuit 25-i form the absolute values of the buffer-stored real parts and respectively output them to the subtractor 26-i. The subtractors form the difference between the absolute value formed and the nominal value, which is one in the instance given.

The calculated differences are supplied in a further circuit 27-i for forming an absolute or magnitude value.

Subtractors 28-i are then used to ascertain the order of the calculated values.

The first subtractor 28-1 compares the output value from the calculation circuit 27-3 with the output value from the calculation circuit 27-2, and a circuit 29-1 outputs a logic high data bit if the output value from the circuit 27-3 is greater than the output value from the circuit 27-2. In the same way, the subtractor 28-3 compares the output value from the circuit 27-2 with the output value from the circuit 27-1, and the circuit 29-3 outputs a logic high data bit to a multiplexer 31 via a control line 30 if the output value from the circuit 27-2 is greater than the output value from the circuit 27-1. In addition, the subtractor 28-2 compares the output value from the circuit 27-3 with the output value from the circuit 27-1, and a circuit 29-3 outputs a logic high data bit if the output value from the circuit 27-3 is greater than the output value from the circuit 27-1.

The control circuit 19 also contains an inverter circuit 32 which applies the supplied data bits in inverted form to the multiplexer 31.

The multiplexer 31 has four data inputs A, B, C, D. In addition, the multiplexer 31 has two outputs E, F. The multiplexer receives a control signal S via the control line 30. The multiplexer 31 connects either the data inputs A, B or the data inputs C, D to the data outputs E, F. The data outputs E, F are used to actuate a downstream ROM store 33 which delivers the position control signal for the multiplexer 21.

The table below explains the way in which the control circuit 19 works in detail.

| $a_{min}$ (ES$_3$) | $a_{min}$ (ES$_2$) | $a_{min}$ (ES$_1$) | POS | 28-1 add1 | 28-2 add2 | 28-3 add3 |
|---|---|---|---|---|---|---|
| 1 | 2 | 3 | 2 | 1 | 1 | 1 |
| 1 | 3 | 2 | 3 | 1 | 1 | 0 |
| 2 | 1 | 3 | 1 | 0 | 1 | 1 |
| 2 | 3 | 1 | 1 | 1 | 0 | 0 |
| 3 | 1 | 2 | 3 | 0 | 0 | 1 |
| 3 | 2 | 1 | 2 | 0 | 0 | 0 |

A=add1
B=add2
C=add1
D=add2
S=add3
If S=1 then E=A=add1 and F=B=add2
If S=0 then E=C=add1 and F=D=add2

| E | F | POS |
|---|---|---|
| 0 | 1 | 1 |
| 1 | 1 | 2 |
| 0 | 0 | 3 |

The buffer store 13 contains three received symbol values which are filtered by a third-order median filter 24. For three buffer-stored values, there are six different possibilities for the order.

The median filter 24 filters out that buffer-stored value whose minimum interval from a nominal data value has in the mean value within the group of calculated minimum intervals. In the example shown, this is the data symbol value ES$_2$ stored in the first row of the table in second place in the buffer store 13. The subtractor 28-3 indicates that the value $a_{min}$ (ES1) is greater than the value $a_{min}$ (ES2). The subtractor 28-2 indicates that the value $a_{min}$ (ES1) is greater than the value $a_{min}$ (ES3). In this case, the subtractor 28-1 indicates that the value $a_{min}$ (ES2) is greater than the value $a_{min}$ (ES3). From this, the control circuit 19 identifies that the minimum interval $a_{min}$ (ES2) associated with the received symbol ES2 is the mean minimum interval. Accordingly, the data bits applied to the data inputs A, B of the multiplexer 31 are connected to the data outputs E, F of the multiplexer 32 in order to actuate the ROM circuit 33. The ROM circuit S3 decodes the applied signal 1.1 as position 2 and uses it to actuate the multiplexer 21.

Figure 9:
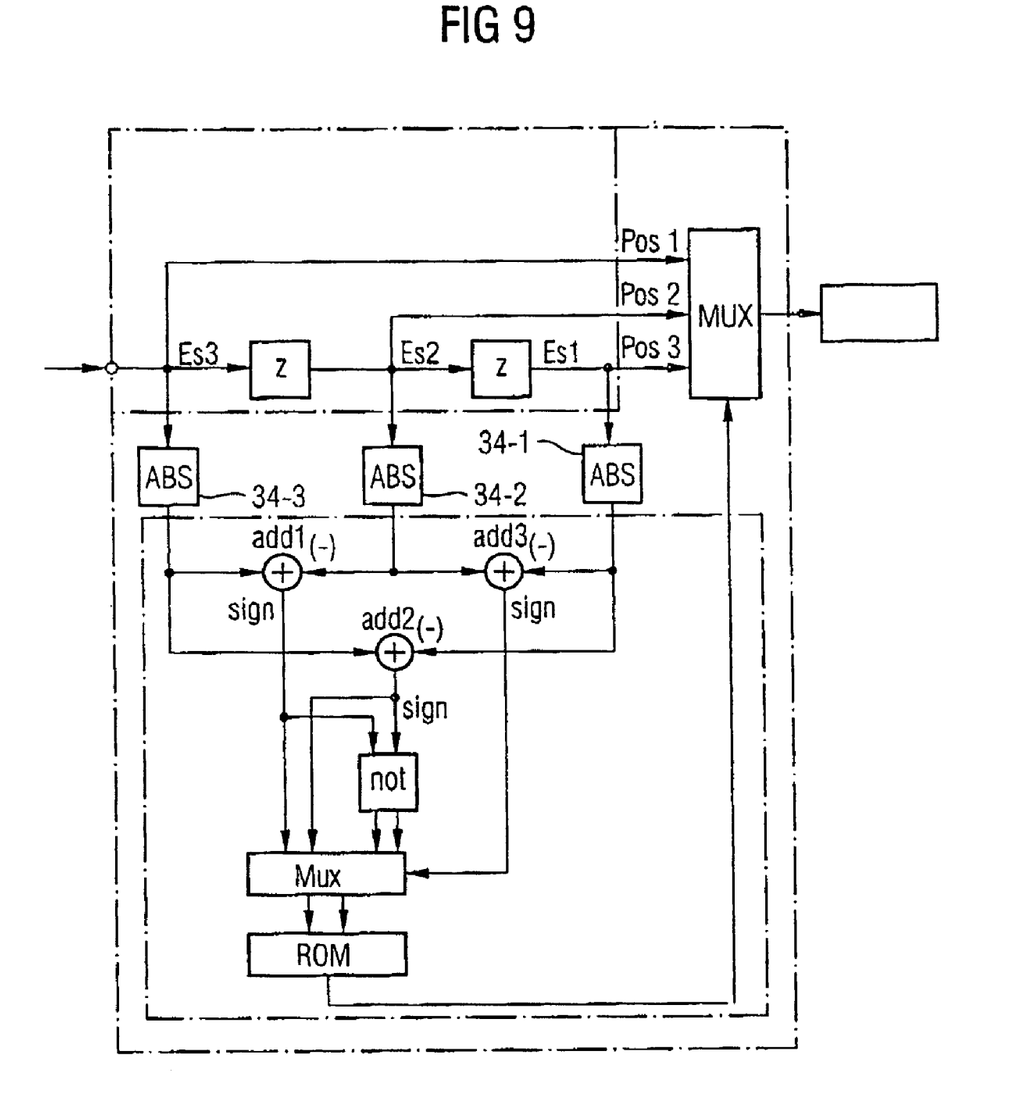
FIG. 9 shows a particularly preferred embodiment of the inventive filter apparatus.

FIG. 9 shows a particularly preferred embodiment which is equivalent to the circuit arrangement shown in FIG. 8. In this case, the two magnitude formation circuits 25-2, 27-2 are replaced by one magnitude formation circuit, or a circuit for forming an absolute value, which is denoted by the reference number 34 in FIG. 9.

Figure 10:
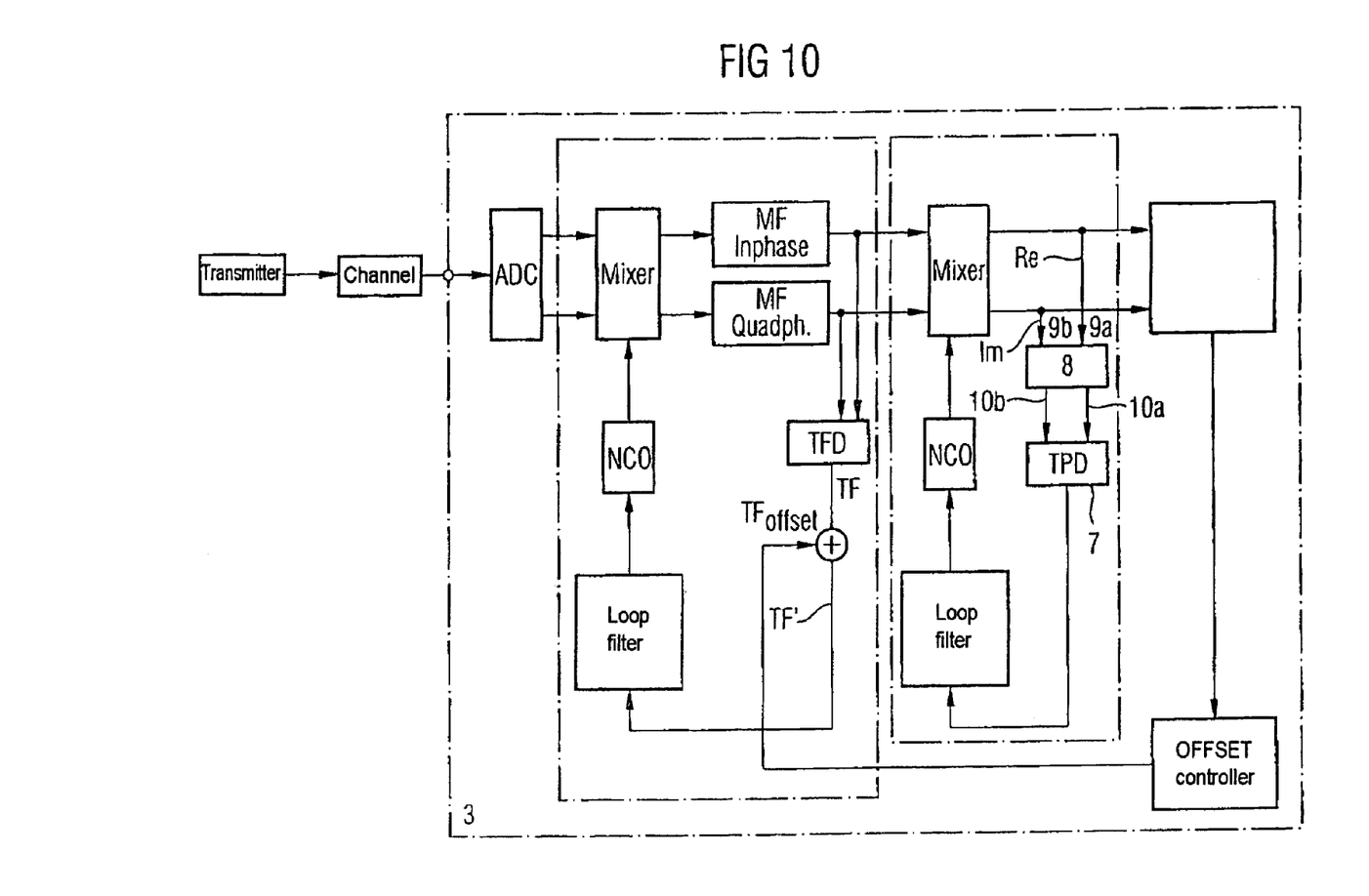
FIG. 10 shows a QAM receiver, containing the inventive filter apparatus, as an example of application.

FIG. 10 shows as an example of application for the inventive filter apparatus 8 in a QAM receiver 3. The receiver 3 uses a data transmission channel to receive an analog received signal which is converted into a digital signal by an analog/digital converter ADC and is supplied to the mixing stage as an inphase signal component and as a quadrature signal component. The mixing stage multiplies the inphase signal component and the quadrature signal component by a control signal which is applied, which comes from a numerically controlled oscillator NCO, in the time domain. The mixed inphase signal component is supplied to an inphase matched filter. The mixed quadrature signal component is sent to a quadrature phase matched filter in the same way. The output signal from the inphase matched filter and the quadrature phase matched filter are applied to a further mixing stage connected downstream. In addition, the output signal from the inphase matched filter and the output signal from the quadrature phase matched filter are applied to a carrier frequency detector TFD. The carrier frequency detector TFD generates a carrier frequency error detection signal TF and sends it to a digital loop filter via a feedback line. The digital loop filter filters the carrier frequency error detection signal TF applied and applies the filtered signal to a first controlled oscillator NCO connected downstream. The numerically controlled oscillator NCO generates the control signal for the first mixing stage on the basis of the filtered carrier frequency error detection signal TF. The first mixing stage forms, together with the matched filters, the carrier frequency detector, the digital loop filter and the controlled oscillator, a carrier frequency loop for the receiver 3 for the purpose of detecting the carrier frequency of the received signal in a first carrier frequency reception range.

The output signals from the two matched filters are supplied to a second mixing stage. The second mixing stage multiplies the output signals applied from the two matched filters by an applied control signal, which is sent by a numerically controlled oscillator NCO, in the time domain. The mixed signals are supplied to a carrier phase lock identification circuit via lines. In addition, the output signals from the second mixing stage are applied to the inventive filter apparatus 8, as shown in FIG. 5. The filter apparatus 8 receives via a first input 9a the real part of the received data symbol and via a second input 9b the imaginary part of the received data symbol ES. The sequence of received data symbols ES are buffer-stored in the filter apparatus 8, and a median filter 24 contained in the filter apparatus 8 calculates the minimum intervals between the buffer-stored data symbols ES and nominal data symbols $ES_{nominal}$. The filter apparatus 8 filters out that data symbol whose calculated minimum interval has a mean value within the group of calculated minimum intervals and sends this data symbol to a carrier phase detector TPD as a decision based system 7. The carrier phase detector 7 generates a carrier phase error detection signal TP which is applied to a digital loop filter via a feedback line. The digital loop filter filters the carrier phase error detection signal TP applied and sends it to the numerically controlled oscillator NCO. In addition, the receiver 3 contains an offset control circuit which applies a carrier frequency offset control signal to an adder within the carrier frequency loop.

The inventive filter apparatus 8 involves the received data symbols ES or the measured values being filtered by the median filter 24. Subsequently, only the mean value or one of the mean values is forwarded to the downstream decision based system 7. If it is assumed that a decision is 5% incorrect and 95% correct and only one decision is ever taken into account, then every twentieth value is incorrect. The inventive filter apparatus 8 uses a third-order median filter 24, for example, to filter three decisions or data symbols ES, the probability that all three decisions are incorrect being $0.5^3$ and the probability that two decisions are incorrect being $3 \times 0.5^2 \times 0.95 = 0.007125$. The overall probability that two or more decisions are incorrect is thus $0.00725 = 0.000125 + 0.007125$, i.e. on average only every 138 value (138=1/0.00725) after the median filter 24 is now incorrect.

If the order of the median filter 24 is increased to n=5, for example, the median filter 24 filters five buffer-stored input data symbols, which means that the probability that three or more decisions are incorrect is $0.05^5 + 5 \times 0.05^4 \times 0.95 + 10 \times 0.05^3 \times 0.95^2 = 0.00116$. In this case, only every eight hundred and sixty-second value sent by the median filter 24 is now incorrect.

The probability that the downstream decision based system 7 will be supplied with an incorrect decision is thus greatly reduced. If, by way of example, the decision based system is a clock phase detector or a carrier phase detector within a receiver 3, this improves the control response and greatly reduces the bit error rate.

The invention claimed is:

1. Apparatus for filtering data symbols for a decision based data processing system, the apparatus comprising:
   (a) a buffer store operable to buffer-store a sequence of n sequentially received data symbols, wherein $n \geq 3$;
   (b) an nth-order median filter operable to calculate the minimum interval between each of the n buffer-stored data symbols and a plurality of nominal data symbols, the nth-order median filter further operable to filter out one data symbol from the n buffer-stored data symbols, wherein the calculated minimum interval for the filtered out one data symbol has a mean value for the n calculated minimum intervals, wherein the median filter comprises
   (b1) a plurality of calculation circuits, each calculation circuit operable to calculate a minimum interval between one of the n buffer-stored data symbols and the plurality of nominal data symbols;
   (b2) a control circuit including (i) a sorting circuit for sorting the calculated minimum intervals according to their value and (ii) a selection circuit for selecting a mean minimum interval from the sorted minimum intervals; and
   (b3) a multiplexer operable to deliver the buffer-stored data symbol associated with the selected mean minimum interval to the decision based data processing system.

2. The apparatus of claim 1 wherein the buffer store is a FIFO register.

3. The apparatus of claim 1 wherein n is an odd number.

4. The apparatus of claim 3 wherein the median filter is a third-order median filter.

5. The apparatus of claim 3 wherein the median filter is a fifth-order median filter.

6. The apparatus of claim 3 wherein the decision based data processing system is a clock phase detector.

7. The apparatus of claim 3 wherein the decision based data processing system is a carrier phase detector.

8. The apparatus of claim 3 wherein the decision based data processing system is an equalizer.

9. The apparatus of claim 3 wherein the plurality of nominal data symbols are stored in a register which is programmable.

10. The apparatus of claim 3 where the mean minimum interval is a median minimum interval.

11. The apparatus of claim 1 wherein the decision based data processing system is a clock phase detector.

12. The apparatus of claim 1 wherein the decision based data processing system is a carrier phase detector.

13. The apparatus of claim 1 wherein the decision based data processing system is an equalizer.

14. The apparatus of 1 wherein the plurality of nominal data symbols are stored in a register which is programmable.

15. The apparatus of claim 1 where the mean minimum interval is a median minimum interval.

* * * * *